United States Patent
Juengling et al.

(10) Patent No.: US 7,406,340 B2
(45) Date of Patent: Jul. 29, 2008

(54) ARRANGEMENT AND INTERFACE MODULE FOR CONNECTING DIFFERENT RADIO TELEPHONES TO OPERATOR COMPONENTS IN A MOTOR VEHICLE

(75) Inventors: Lars Juengling, Lich (DE); Ralf Oberländer, Solms (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/547,248

(22) PCT Filed: Dec. 16, 2003

(86) PCT No.: PCT/DE03/04149

§ 371 (c)(1),
(2), (4) Date: Aug. 26, 2005

(87) PCT Pub. No.: WO2004/080042

PCT Pub. Date: Sep. 16, 2004

(65) Prior Publication Data

US 2006/0161312 A1 Jul. 20, 2006

(30) Foreign Application Priority Data

Mar. 6, 2003 (DE) ................................ 103 10 115

(51) Int. Cl.
*H04M 1/00* (2006.01)

(52) U.S. Cl. .................. 455/569.2; 455/90.1; 455/90.2; 455/550.1; 455/569.1; 455/575.1; 701/2

(58) Field of Classification Search ............. 455/569.2, 455/90.2, 90.3, 351, 425, 525, 345, 550.1, 455/556.1, 556.2, 557, 564, 569.1, 575.1; 379/201.05, 420.01, 420.04, 433.01, 428.01; 701/2, 200; 710/305

See application file for complete search history.

(56) References Cited

U.S. PATENT DOCUMENTS 6,341,218 B1 * 1/2002 Poplawsky et al. ....... 455/569.1

(Continued)

FOREIGN PATENT DOCUMENTS

DE 198 48 791 A1 4/2000

(Continued)

OTHER PUBLICATIONS

2005Q14232DE BMW AG München; Zeusatzbetriebsanleitung BMW Handy Bedienung über MID, MFL, Bordmonitor; pp. 1-20; Germany; XP 002277916.

(Continued)

*Primary Examiner*—Matthew Anderson
*Assistant Examiner*—Shaima Q Aminzay
(74) *Attorney, Agent, or Firm*—Cohen Pontani Lieberman & Pavane LLP

(57) ABSTRACT

The invention relates to an arrangement for remote controlling a mobile radio telephone (1) in a motor vehicle with a standard hands-free device (2), which is installed as an independent item of equipment in the vehicle, contains a microphone and a loudspeaker and which is connected to the radio telephone (1). According to the invention, the radio telephone (1) is connected via an independent central interface module (5) to an input unit (3) and to an output unit (4) of another electronic item of equipment installed in the vehicle. The interface module (5) communicates via standardized interfaces (6) with the radio telephone (1) and with the input unit (3) and with the output unit (4) and contains a communications management unit (7) for converting the data formats between the radio telephone (1) and the input unit (3) and the output unit (4).

21 Claims, 2 Drawing Sheets

U.S. PATENT DOCUMENTS

| | | | |
|---|---|---|---|
| 6,377,825 B1 * | 4/2002 | Kennedy et al. | 455/569.2 |
| 6,430,413 B1 * | 8/2002 | Wedi et al. | 455/442 |
| 6,629,183 B1 * | 9/2003 | Gortz et al. | 710/305 |
| 7,035,668 B2 * | 4/2006 | Kobayashi | 455/556.1 |
| 2002/0025832 A1 * | 2/2002 | Durian et al. | 455/556 |
| 2002/0032042 A1 * | 3/2002 | Poplawsky et al. | 455/564 |
| 2002/0137505 A1 * | 9/2002 | Eiche et al. | 455/425 |

FOREIGN PATENT DOCUMENTS

| | | |
|---|---|---|
| DE | 199 21 533 C1 | 1/2001 |
| DE | 102 15 928 A1 | 10/2003 |
| WO | WO 01/19646 A1 | 3/2001 |

OTHER PUBLICATIONS

2005Q14234 DE Universeller Bluetooth-Adapter für Auto-Freisprechanlagen; http:/www.de/newsticker/melding/p; Nov. 6, 2002; Germany; XP-002278001.

German Office Action dated May 9, 2005 for application No. 2003P01405.

* cited by examiner

ARRANGEMENT AND INTERFACE MODULE FOR CONNECTING DIFFERENT RADIO TELEPHONES TO OPERATOR COMPONENTS IN A MOTOR VEHICLE

CROSS-REFERENCE TO RELATED APPLICATIONS

This is a U.S. national stage of application No. PCT/DE03/04149, filed on 16 Dec. 2003. Priority is claimed on the following application: Country: Germany, Application No.: 103 10 115.2, Filed: 6 Mar. 2003.

BACKGROUND OF THE INVENTION

The invention relates to an arrangement for remotely controlling a mobile radio telephone in a motor vehicle, where the radio telephone is connected to a standard hands-free device which is installed as a stand-alone appliance in the vehicle and which contains a microphone and a loudspeaker. The invention also relates to an interface module for setting up a communication link between a radio telephone and an input unit and an output unit which are suitable for remotely controlling the radio telephone.

In line with legislation, mobile radio telephones in motor vehicles must be operated using hands-free devices for safety reasons. In this context, the standard design of a hands-free device essentially comprises a microphone and a loudspeaker and also an interface to the radio telephone. Optionally, a telephone receptacle may be provided into which the radio telephone is plugged during the journey. Standard hands-free devices are installed as stand-alone appliances in the vehicle. In the meantime, integrated systems are also being offered on the vehicle market which have the hands-free function implemented by means of an audio system which is already installed in the vehicle. To this end, the radio telephone is connected to the audio system either by means of a cable or by means of a short-haul radio link. Such an integrated system using a short-haul radio link is known from DE 19921533 C1, for example. Besides the provision of the hands-free function, the audio system described therein can simultaneously be used for operating the mobile telephone.

The approach to remotely controlling the radio telephone using control and/or display elements on a navigation, multimedia or audio appliance is also pursued in other systems available on the vehicle market, with either the radio telephone or a hands-free device developed specifically for the appliance in question being connected to these appliances. The control elements used are keys, rotary knobs or screens with a touch function, for example, while any kind of display may be used for the display.

All of these integrated systems, regardless of whether they are designed exclusively for hands-free talking or else for remote control, represent special solutions in each case which force the user to use exclusively appliance combinations which are matched to one another. The associated costs and the restriction to just a few types of radio telephones which are to be used mean that many car drivers prefer standard hands-free devices, which are much less expensive and can easily be adapted or even maintained when the radio telephone is changed.

Although standard hands-free devices have the hands-free function guaranteed, the car driver is reliant, for the purpose of operation, on the keypad and on the display of the radio telephone, which are not always easy to access or to identify during the journey. Some standard hands-free devices therefore have provision for voice operation or are equipped with an additional remote control and display. Drivers use voice operation only reluctantly, however. There is generally a natural threshold of inhibition for speaking to technical appliances, and this threshold of inhibition is increased further when there are other people present in the vehicle.

US-2002/0032042-A1 discloses a mobile telephone holder for a motor vehicle with an integrated voice control function for the mobile telephone. The telephone holder can have an external appliance connected to it which can then likewise be operated by voice input.

U.S. Pat. No. 629,183 describes an interface device for transmitting information between input/output means and application appliances. The application appliances, such as radio, CD player, mobile telephone, navigation system or onboard computer, are connected via the interface device directly to input means, such as a keypad, rotary/push control, microphone or video camera, and also to output means, such as a screen or loudspeaker.

On the Internet, an article has been published with the title "Universeller Bluetooth-Adapter für Auto-Freisprechanlage" [Universal Bluetooth adapter for car hands-free installation] on 2002 Nov. 6 at the address www.heise.de/newsticker/meldung/32125. The Bluetooth adapter is connected to arbitrary hands-free devices by means of a cable. A mobile telephone equipped with a Bluetooth interface can then be connected to the hands-free device by means of Bluetooth. The adapter has special keys which can be used to control a few functions, such as accepting or ending a telephone call or setting the volume.

SUMMARY OF THE INVENTION

It is therefore an object of the present invention to take an arbitrary standard hands-free device in the vehicle as a basis for allowing simultaneous remote control of a radio telephone.

The object is achieved by an arrangement based on a standard hands-free device with a microphone and a loudspeaker, which device is already installed as a stand-alone appliance in the vehicle. The standard hands-free device communicates with the radio telephone by cable or by wireless short-range link, such as Bluetooth or infrared, and normally has an additional telephone holder.

According to the present invention a stand-alone, central interface module is used for setting up a communication link between the radio telephone connected to the standard hands-free device and input and output units which are present in the vehicle and which can be used for remotely controlling the telephone. In this regard, almost every recently constructed vehicle has at least one audio appliance, if not a navigation appliance or multimedia system. A feature of the invention is that the interface module communicates with all of the components via standardized interfaces. The interface module contains a communication management unit which converts the data formats between the radio telephone and the input and output units. The use of an interface module with standardized input and output interfaces makes it possible to connect any vehicle appliances on the market to the radio telephone, which provides the user with more options for assembling the vehicle systems. Since the interface module performs the necessary transformation of the communication data into one another, the systems to be connected no longer have to have interfaces which are matched to one another, as is necessary in the case of the integrated systems described at the outset.

In one specific embodiment, provision is made for using the control unit of a vehicle multimedia system for remotely controlling the radio telephone. In another embodiment, a navigation appliance is used. On the basis of today's prior art, these systems communicate via an RS232 or D2B bus to which the interface module is simply connected as well. In addition, it is also possible to use car radios, Notebooks or PDAs for remotely controlling a radio telephone. In all of these appliances, there is both an input unit, such as a keypad, voice input, touchscreen or control buttons, and an output unit, such as a screen, LCD display or voice output. However, it would also be conceivable to use the interface module to connect a stand-alone keypad and an output monitor if the vehicle does not contain any other appliances with suitable man-machine interfaces (MMIs). In a further development of the interface module, there is provision for a plurality of said appliances to be connected simultaneously, with either the unit which is to be used for remotely controlling the radio telephone being stipulated in advance or else the interface module being able to be used for selection. When a plurality of appliances are connected, the interface module may also be used for data interchange between these appliances.

The communication link between interface module and radio telephone can be set up in two ways. Either there is a wireless short-range link, e.g., via Bluetooth or infrared, between the two, or they are both connected to a data bus. In the latter case, one specific solution involves an already existing data link between the standard hands-free device and the radio telephone having the same data bus used also for the link between the radio telephone and the interface module. The direct link between the standard hands-free device and the radio telephone is broken and the interface module is interposed. In all cases, the hands-free function of the standard hands-free device is always used.

So that the communication management unit can convert the data formats between radio telephone and input and output units, it needs to have the appliance-specific instruction sets for data transmission. These are usually stored in a memory area provided in the interface module. It is now possible to store the instruction sets for as large as possible a number of radio telephones and vehicle computer systems which are on the market and to load them into the communication management unit in accordance with the connected appliance. However, this requires a considerable amount of memory space. In addition, newly developed appliances are not given any consideration at all. If the user later decides to buy a new telephone or a new audio system, for example, the instruction sets need to be subsequently maintained in any case, which either needs to be done by the user himself or by a workshop. To reduce this complexity, one specific embodiment has provision for the interface module to be able to set up a remote radio link to an external server independently. This radio link can then be used to request and receive the instruction sets for newly identified appliances. Setup of the remote radio link may likewise be prompted by one of the connected appliances with an input and output unit, i.e. the interface module reacts to a data instruction from an external appliance and then sets up the radio link. It is likewise conceivable for a wireless or else wired link to be set up to a computer system, such as a Notebook or PDA, carried in the vehicle so as to load the requisite data records from said computer system. The interface module and particularly the simplified software update when changing the radio telephone allow a user to compile the arrangement comprising the vehicle computer system and the radio telephone with standard hands-free device flexibly. When demands have increased, updating can easily be carried out. If a standard hands-free device with a radio or infrared interface is used from the outset, it is no longer necessary when changing the telephone to make adjustments in the interface region between the radio telephone and the hands-free device.

In one specific embodiment, the interface module has a special bus interface which can be used to connect supplementary modules. The bus interface may be an inherent development of the manufacturer of the interface module or else may be a standard expansion interface such as USB. In specific embodiments, this bus interface is used to link a Bluetooth module or an Internet module to the interface module. In addition, suitable supplementary modules are CAN and infrared modules, modules for voice recognition or voice output and also modules for converting vehicle-related functions such as fleet management and vehicle position-finding. The list can be expanded as desired. An Internet module may be used, in particular, to set up a remote radio link to an external server or else a local link to a computer carried in the vehicle when an external appliance is changed and to download the new instruction set for communicating with this appliance.

DETAILED DESCRIPTION OF THE PREFERRED EMBODIMENTS

Figure 1:
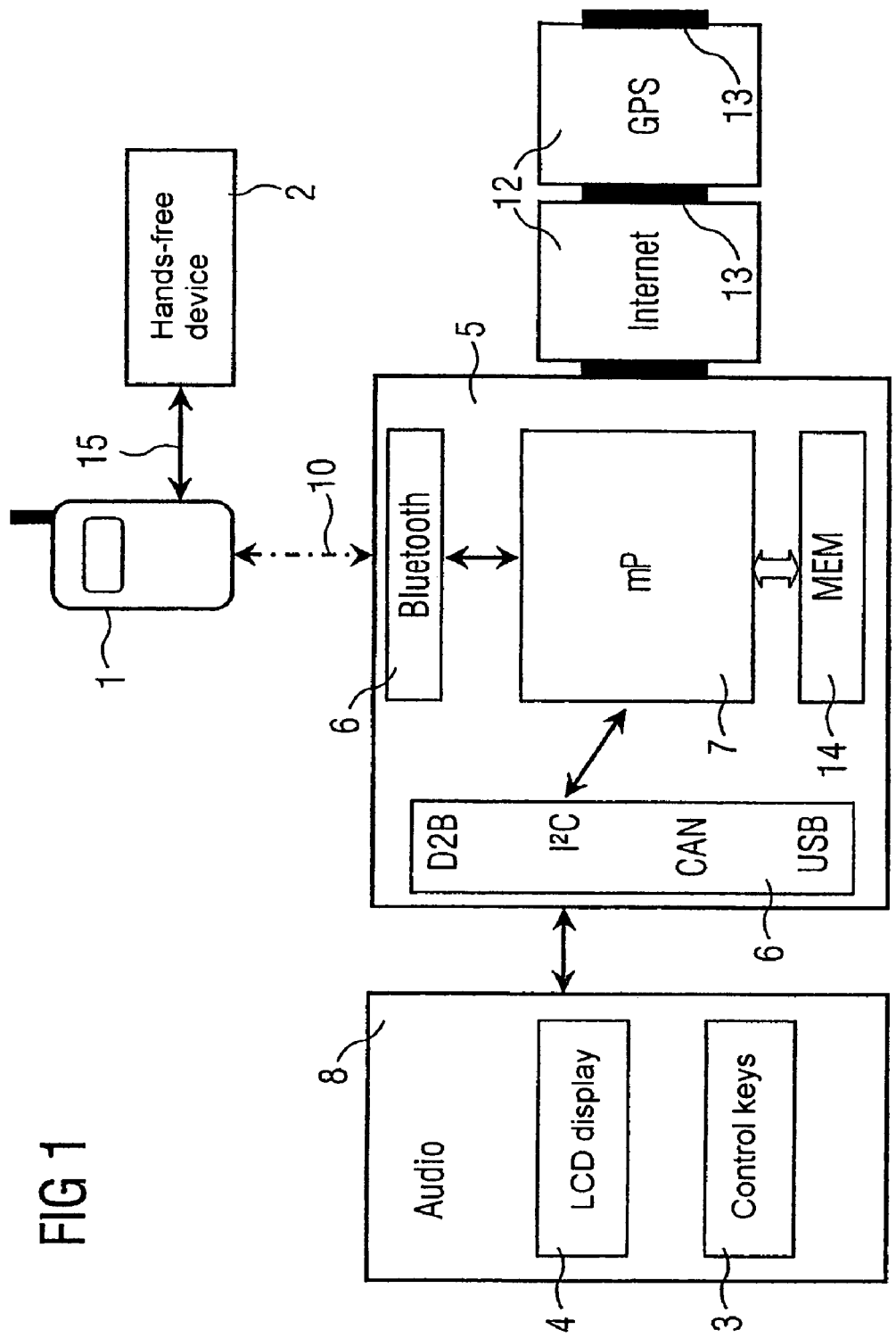
FIG. 1 is a block diagram of an arrangement for connecting a radio telephone to an audio system.

FIG. 1 shows a radio telephone 1 which is in a telephone holder (not shown here) in a standard hands-free device 2. The standard hands-free device 2 also includes a microphone and a loudspeaker. A plug connection in the telephone holder and also a cable 15 are used for electrically connecting the radio telephone 1 to the standard hands-free device 2. The radio telephone 1 communicates with an interface module 5 via a Bluetooth radio link 10. This interface module 5 has an entire series of standard interfaces 6. Thus, besides a Bluetooth interface, connections for D2B, I$^2$C, CAN and USB bus links are also provided. The bus connections merely occupy the I$^2$C interface, and specifically an audio system 8 is connected in this case. In the interface module 5, a communication management unit 7, in the specific case a microprocessor, provides for converting the various input/output data formats into one another. In the case illustrated, the radio telephone data received in the Bluetooth format are converted into the I$^2$C format which the audio system understands, and vice versa. The information required for this purpose, i.e. the appliance-specific instruction sets, is fetched from the memory area 14 by the communication management unit 7. The audio system 8 incorporates an output unit 4 in the form of an LCD display and an input unit 3 in the form of control keys. These units can be used to operate not only the audio system itself but also the radio telephone. The telephone holder with the radio telephone 1 can accordingly be mounted at an arbitrary location in the vehicle interior which the driver cannot reach during the journey. In addition, if a Bluetooth link instead of the cable link 15 is selected between the radio telephone 1 and the standard hands-free device 2, it is not even necessary to plug the radio telephone 1 into the telephone holder. It then suffices if the radio telephone 1 is simply in the reception range of the standard hands-free device 2 and of the interface module 5.

As is also evident from FIG. 1, the interface module 5 can be expanded by supplementary modules 12 via the bus interface 13. The supplementary modules 12 are specifically an Internet module and a GPS module. The Internet module can be used by the interface module 5 in order to set up an Internet radio link to an external server when the radio telephone 1 or else the audio system 8 is replaced by a respective new appliance, and download the new instruction sets for the communication management unit 7 from said external server, these instruction sets then being stored in the memory unit 14. The GPS module is used for vehicle position-finding, which may be of interest in connection with a fleet management system, for example, particularly in cases in which there is no stand-alone navigation system with an integrated position-finding unit.

Figure 2:
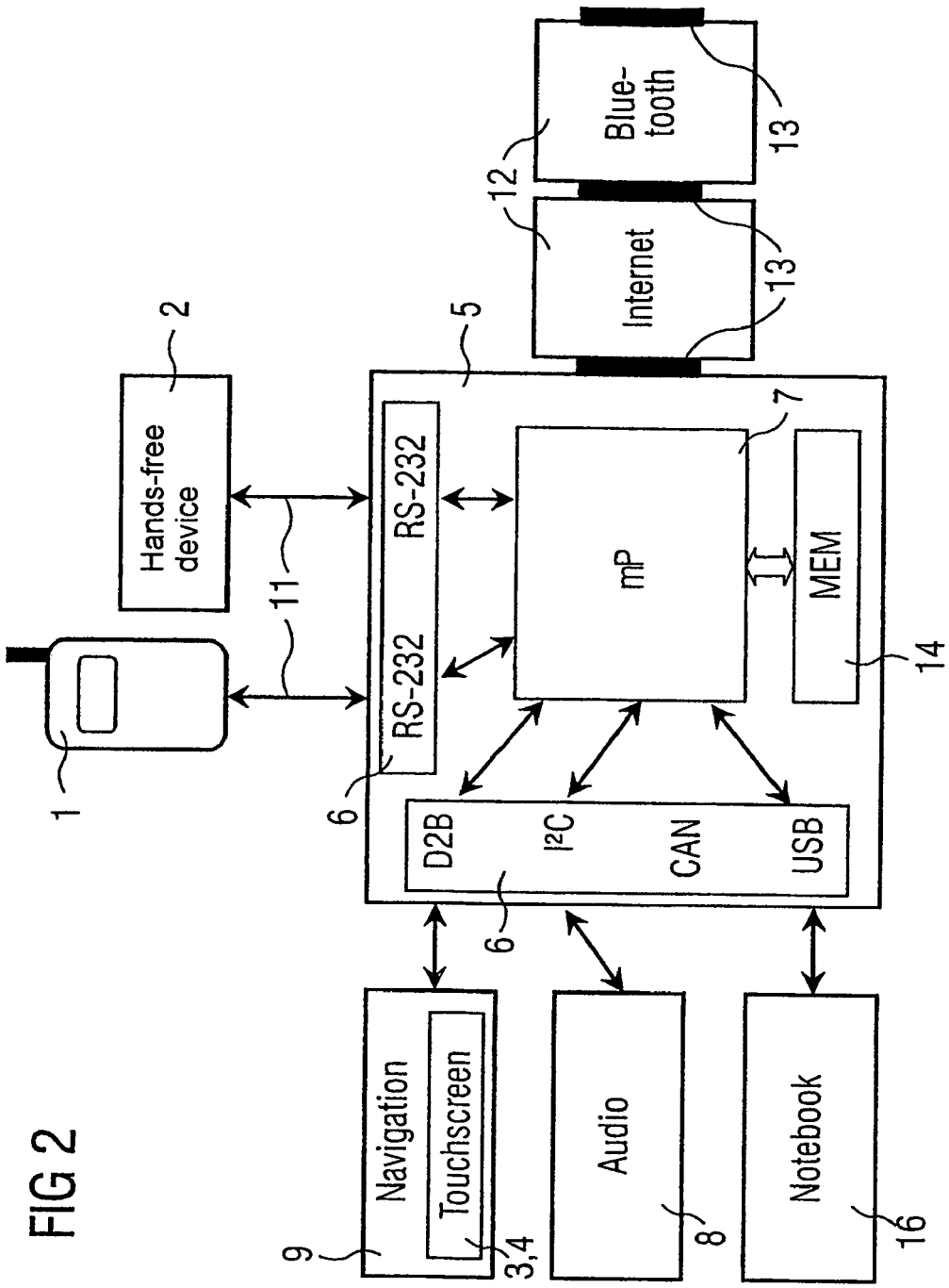
FIG. 2 is a block diagram of an arrangement for connecting a radio telephone to a navigation system.

FIG. 2 shows a similar arrangement to FIG. 1. Differences in this case involve only the type of communication link between the interface module 5 and the radio telephone 1 and also the number of connected appliances with an input/output function. In this case, the radio telephone 1 and the standard hands-free device 2 communicate via a serial RS232 bus. The direct link between the two has been broken and the interface module 5 has been interposed. On the one hand, the data to be transmitted directly can simply be looped through between the radio telephone 1 and the standard hands-free device 2 by the interface module, i.e. they are forwarded unchanged. On the other hand, the interface module 5 with its communication management unit 7 is used to convert the remote control data for the radio telephone 1. These remote control data are transmitted between a selected external appliance with an integrated input and output unit and the radio telephone 1. As external appliances with an input/output unit, an audio system 8, a Notebook 16 and a navigation system 9 are shown here. The audio system 8 has control keys and also an LCD display and the Notebook has a conventional keypad and a screen, these elements not being shown at the same time. Only the touchscreen of the navigation system 9, which touchscreen is used simultaneously as an input unit 3 and as an output unit 4, is graphically highlighted. The navigation system 9 has been selected, e.g. using a selector switch on the interface module 5, as remote control for the radio telephone 1, which means that the communication management unit 7 converts and transmits the radio telephone data exclusively between the RS232 interface associated with the radio telephone 1 and the D2B bus link to the navigation system 9. In a further development of the communication management unit 7, the latter may also forward data between the external vehicle computer systems (8, 9, 16). It is thus of interest, for example, to forward the traffic information received via the audio system 8 to the navigation system 9 or to include particular appointment and location information from a schedule stored in the Notebook 16 into the route planning which is to be carried out in the navigation system 9. This type of information interchange between vehicle computer systems is also already taking place today, but the use of the interface module 5 with the standard interfaces 6 results in new combination options.

The expansion of the interface module 5 by an Internet module is also depicted in FIG. 2. Apart from the function already described for updating the communication instruction sets, it is possible to use an Internet link to receive navigation-related information too, for example. Any type of information interchange between the vehicle computer systems and external data servers becomes possible in this way. In addition, a Bluetooth module is provided as one of the supplementary modules 12.

The invention claimed is:

1. A system for remotely controlling a mobile radio telephone in a motor vehicle, comprising:

a hands-free device including a microphone and a speaker, the hands-free device being a standalone appliance;

a central interface module connectable to said hands-free device and connected to the mobile radio telephone; and a further electronic appliance installed in the motor vehicle and comprising an input unit and an output unit connected to said central interface unit so that said central interface module connects the mobile radio telephone to said input unit and said output unit for communicating remote control data between the mobile radio telephone and said input unit and said output unit when the mobile radio telephone is connected to said central interface module, said input unit and said output unit being used to operate the mobile radio telephone based on the remote control data from at least one of the input unit and the output unit to effect a telephone call over the mobile radio telephone;

said central interface module including standardized interfaces for communicating with the mobile radio telephone and said input unit and said output unit, and a communication management unit for converting data formats of the remote control data between the mobile radio telephone and said input unit and said output unit.

2. The system of claim 1, wherein said further electronic appliance comprises at least a portion of an audio system such that said input unit and said output unit are parts of said audio system.

3. The system of claim 1, wherein said further electronic appliance comprises at least a portion of a navigation system such that said input unit and said output unit are parts of said navigation system.

4. The system of claim 1, further comprising a plurality of electronic appliances installed in the vehicle, each having at least one of input units or output units simultaneously connected to said central interface module.

5. The system of claim 1, wherein a communication link between the radio telephone and said central interface module comprises a short-range wireless link.

6. The system of claim 1, wherein a communication link for connecting the radio telephone to said central interface module comprises a data bus.

7. The system of claim 6, wherein said data bus connecting the radio telephone and said central interface module also connects the radio telephone and said hands-free device, said interface module being connected between the radio telephone and said hands-free device by said data bus.

8. The system of claim 1, said interface module comprises means for setting up an independent radio link to an external server.

9. The system of claim 8, said interface module further comprising means for requesting and receiving information required for converting the data formats between the radio telephone and said input unit and said output unit from the external server by radio signal.

10. The system of claim 1, further comprising a special bus for connecting a supplementary module to said central interface module, said supplementary module being used for expanding the functionality of said central interface module.

11. The system of claim 10, wherein said supplementary module comprises an internet module.

12. The system of claim 10, wherein said supplementary module comprises a Bluetooth module.

13. An interface module for setting up a communication link between a radio telephone and an input unit and an output unit, wherein the input unit and output unit are integrated in an external appliance and are suitable for remotely controlling and operating the radio telephone using control and display elements, said interface module comprising:

standardized interfaces for communicating with the radio telephone and with the input unit and the output unit; and a communication management unit for converting data formats of the remote control data communicated between the radio telephone and the input unit and the output unit so that the radio telephone is operable using the input unit and the output unit of the external appliance based on the remote control data from at least one of the input unit and the output unit to effect a telephone call over the mobile radio telephone.

14. The interface module of claim 13, further comprising a short-range wireless link for communicating with the radio telephone.

15. The interface module of claim 13, further comprising a data bus for communicating with the radio telephone.

16. The interface module of claim 15, wherein said data bus is further arranged for connecting the radio telephone and a standard hands-free device, and said interface module is connectable between the radio telephone and the standard hands-free device using said data bus.

17. The interface module of claim 13, further comprising a special bus interface connectable to at least one supplementary module for expanding the functionality of said interface module.

18. The interface module of claim 17, further comprising a supplementary module connected to said interface module by said special bus, said supplementary module comprises an internet module.

19. The interface module of claim 17, further comprising a supplementary module connected to said interface module by said special bus, said supplementary module is a Bluetooth module.

20. The interface module of claim 13, further comprising means for setting up an independent radio link to an external server.

21. The interface module of claim 20, further comprising means for requesting and receiving information required for converting the data formats between the radio telephone and the input unit and the output unit from the external server using the independent radio link.

* * * * *